No. 806,669. PATENTED DEC. 5, 1905.
S. HILL.
GLASS BLOWING MACHINE.
APPLICATION FILED JULY 10, 1901.

Witnesses:

Inventor:
Stafford Hill
By Wilkinson + Fisher
Attorneys

No. 806,669. PATENTED DEC. 5, 1905.
S. HILL.
GLASS BLOWING MACHINE.
APPLICATION FILED JULY 10, 1901.

No. 806,669. PATENTED DEC. 5, 1905.
S. HILL.
GLASS BLOWING MACHINE.
APPLICATION FILED JULY 10, 1901.

Witnesses:
Jco. Byrne
Fred Englert

Inventor:
Stafford Hill
By Wilkinson & Fisher
Attorneys.

No. 806,669. PATENTED DEC. 5, 1905.
S. HILL.
GLASS BLOWING MACHINE.
APPLICATION FILED JULY 10, 1901.

Witnesses:

Inventor:
Stafford Hill
By Wilkinson + Fisher
Attorneys:

No. 806,669. PATENTED DEC. 5, 1905.
S. HILL.
GLASS BLOWING MACHINE.
APPLICATION FILED JULY 10, 1901.

No. 806,669. PATENTED DEC. 5, 1905.
S. HILL.
GLASS BLOWING MACHINE.
APPLICATION FILED JULY 10, 1901.

Witnesses:

Inventor:
Stafford Hill
By Atkinson & Fisher
Attorneys.

No. 806,669. PATENTED DEC. 5, 1905.
S. HILL.
GLASS BLOWING MACHINE.
APPLICATION FILED JULY 10, 1901.

UNITED STATES PATENT OFFICE.

STAFFORD HILL, OF LONDON, ENGLAND.

GLASS-BLOWING MACHINE.

No. 806,669.  Specification of Letters Patent.  Patented Dec. 5, 1905.

Application filed July 10, 1901. Serial No. 67,741.

*To all whom it may concern:*

Be it known that I, STAFFORD HILL, merchant, a subject of the King of Great Britain, residing at London, England, have invented a certain new and useful Glass-Blowing Machine, of which the following is a specification.

This invention relates to the manufacture of glass bottles by machinery; and it consists of improvements in methods of manufacturing glass bottles by machinery, as well as improvements in machinery for this purpose, the said improvements comprising (*inter alia*) the following features:

First. Weighing each charge of glass in the parison or measuring-mold and means therefor.

Second. Improved neck-mold adapted to form a smooth exterior to the neck of the bottle.

Third. Improved neck-mold adapted to form an interior screw-thread in the bottle-neck.

Fourth. Improved neck-mold adapted to form exterior screw-thread on the bottle-neck.

Fifth. Neck-mold mounted on and carried by the plunger-casing.

Sixth. Movable lower end to said plunger.

Seventh. Means to form trumpet-mouthed or tapered opening at the end of the air-passage through the plunger—*i. e.*, the outlet (where the air escapes from the plunger into the mold) is bell-mouthed and forms an expanding-chamber for the air-supply.

Eighth. Directing the expanded air in the form of a ring in a lateral direction into the mold, so as to produce a gentle blowing action instead of sending the air into the mold in the form of a strong single column or jet in a downward direction as heretofore.

Ninth. Mounting the combined plunger and neck-mold system so as to be adapted to be moved round a vertical spindle and arranging the finishing blowing mold or molds concentrically with said vertical spindle, so that the measured charge of molten glass pressed into the parison or preliminary form in the measuring-mold and adhering to the neck-mold and plunger can be lifted by the latter system out of the measuring-mold and swung round, together with the neck-mold and plunger, and placed in the finishing blowing-mold and the blowing operation then finished in the latter mold.

Tenth. Mounting the measuring (*i. e.*, weighing) mold and also finishing blowing mold or molds in the same arc of a circle concentric with the center around which the said system of combined neck-mold and plunger can be moved.

Eleventh. Pneumatic system adapted to (*a*) cut off the air-supply from passing through the hollow plunger and at same time draw up the movable plunger end in closed position against the plunger; and (*b*) admit the air-supply through the hollow plunger and simultaneously release the movable end of said plunger and allow same to drop, and thereby permit the air-supply to flow through the plunger and pass out of the lower end thereof.

My present improvements also comprises other features and details, all of which will be fully described hereinafter and finally pointed out in the claims.

In order that the invention may be thoroughly understood and readily carried into practice, I will proceed to describe same with reference to the drawings hereunto annexed.

Fig. 2ª is a detail view showing the lever for lifting the bottle in the mold. Figs. 13 to 21 show, on an enlarged scale, various views and details of the neck-mold and its adjuncts, measuring-mold, and finishing-molds shown in Figs. 1 to 12, viz.

Referring now more particularly to Figs. 1 to 12 of the drawings, a vertical column or pillar 1 is mounted on the platform or base 2, which latter may be provided with rollers 3 3 (on which to move said machine about) and also provided with one or more claws or screw-pins 4, adapted to thereby hold the machine in position at the desired place, or said column may be mounted on a fixed base, as desired. A horizontal table 5 is mounted on said column 1 at a suitable height from the base 2 and supported at intervals around its front edge 6 by strong supports 7 7. The parison or measuring-mold for receiving the charge of molten glass is mounted on the loose plate 9, which latter rests on the fixed table 5 and can be slightly raised therefrom by the vertical pin 10 passing freely through the table 5, which pin 10 at its upper end supports said loose plate 9 and the mold 8 thereon when in the position shown in Fig. 3, the lower end of said pin 10 being suitably connected at 11 to the scale-beam 12, said scale-beam 12 being adapted to turn upon the point 13 in the support 14, depending from the under side of the table 5, said scale-beam 12 being weighted at 15 to any desired extent, according to the predetermined weight of glass desired for making each bottle.

Figure 3:
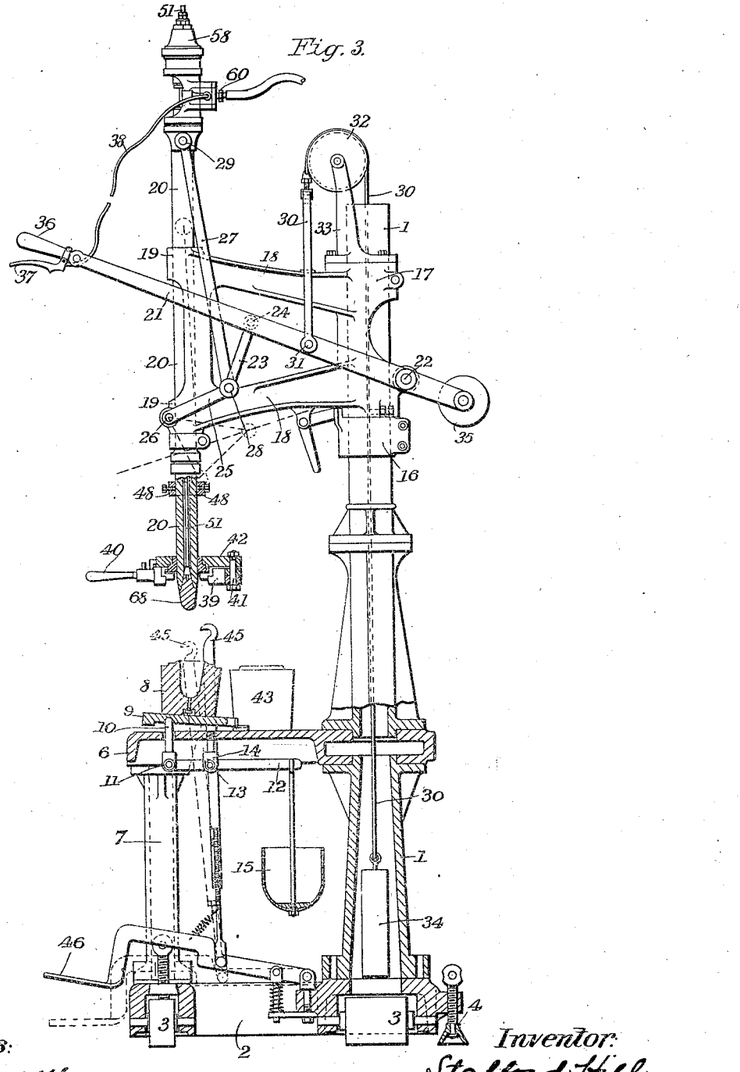
Fig. 3 is a side view of the machine, partly in elevation and partly in section, on line *a a*, Fig. 2.
Figure 4:
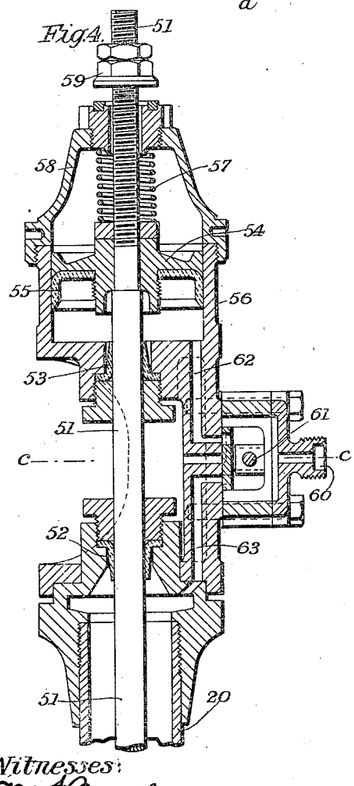
Fig. 4 is a detail vertical sectional view on line *b b*, Figs. 5 and 7, on an enlarged scale, of the upper part of the plunger, showing the pneumatic system and air-valve, &c., for operating the movable lower end 68 of the plunger 20 and controlling the air-supply for blowing the bottle in the finishing-mold 43.
Figure 5:
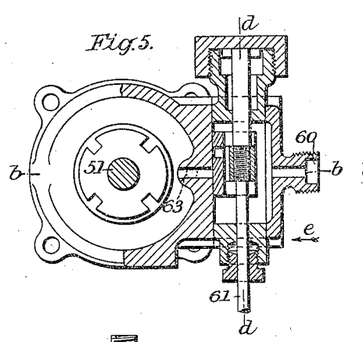
Fig. 5 is a cross-sectional view on line *c c*, Fig. 4.
Figure 6:
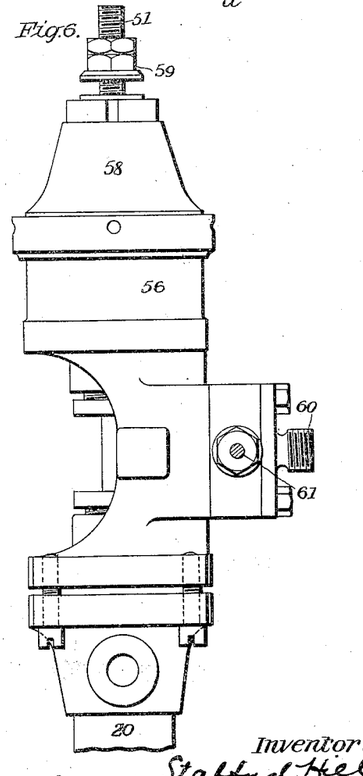
Fig. 6 is a side elevation of Fig. 4 on the same enlarged scale.
Figure 7:
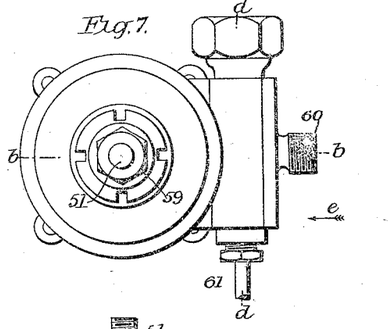
Fig. 7 is a plan of Fig. 6.
Figure 8:
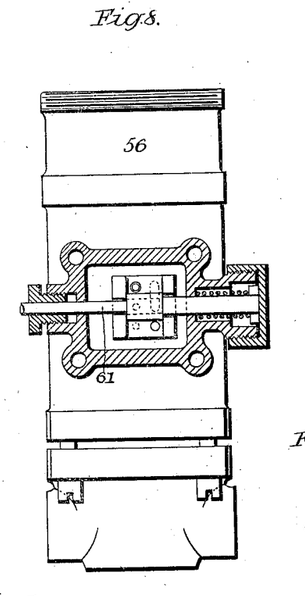
Fig. 8 is a detail view in elevation, partly in section, on lines *d d*, Figs. 5 and 7, looking in the direction of the arrow *e*, showing in section details of a three-way air-regulating valve of the well-known construction.

The upper part of the vertical column or pillar 1 is provided with a collar 16, adapted to be fixed rigidly (at any desired point) in position on said pillar 1, so as to support the sleeve 17 at any desired height thereon, as and for the purposes hereinafter explained. A sleeve 17 is adapted to fit over said pillar 1 (so as to be free to be turned around the latter) and rests on said collar 16. This sleeve 17 carries the laterally-extending frame or arms 18, at the front end of which is a sleeve or sleeves 19, through which the plunger 20 is adapted to be freely reciprocated in the direction of its length by means of the operating-lever 21, (pivoted at 22 to said sleeve 17,) link 23, (pivoted at 24 to the lever 21,) and link 25, (pivoted at 26 to the sleeve 19,) said links 23 and 25 being pivoted together and to the connecting-rod 27 at the point 28, thereby forming a toggle, the upper end of said connecting-rod 27 being connected at 29 to the plunger 20, whereby the latter is operated. The lever 21 is normally held in the raised position, as shown in Fig. 3, by means of the flexible connection 30, one end of which is attached at 31 to the lever 21 and passing over the pulley 32 (supported in arms 33 on the sleeve 17) and descending through the hollow pillar 1 and carrying on the other end thereof the weight 34 inside said pillar, or said lever 21 may be provided with a suitable counterbalance-weight 35, or both the weights 34 and 35 may be used or any other equivalent or suitable counterbalance arrangement may be employed, as desired. At the other end of this lever 21 a suitable handle 36 is provided for the operator to grasp to operate said lever, and adjacent to this handle 36 I arrange a second handle 37 or means to operate the air-admission valve through any suitable medium 38, (for instance, two flexible members so arranged that a relative longitudinal movement, one with respect to the other, can be set up, such as is known as "Bowden wire," such as described in British patent No. 25,325 of 1896,) by which latter and its operating device 37 the operator can control the air-valve 61 and direct the air-supply to either one side or the other of a pneumatic system, whereby the movable lower end 68 of the plunger 20 can be either raised against its seating in the lower end of said plunger 20 and the air-supply through said hollow plunger 20 cut off or the said movable end can be lowered and the air-supply permitted to pass through said hollow plunger when desired and escape from the lower end thereof. Near the lower end of said hollow plunger 20 I arrange and mount the neck-mold 39, which is formed in two halves, each half provided with an operating and locking handle 40 and any suitable means to lock said two halves together, these two parts 39 of the neck-mold being mounted on the pivot 41, which latter is carried in the plate 42, carried on the tubular plunger 20, as hereinafter explained, so that when such plunger 20 is raised or lowered (by the lever 21) consequently the neck-mold 39 is raised and lowered therewith.

Figure 15:
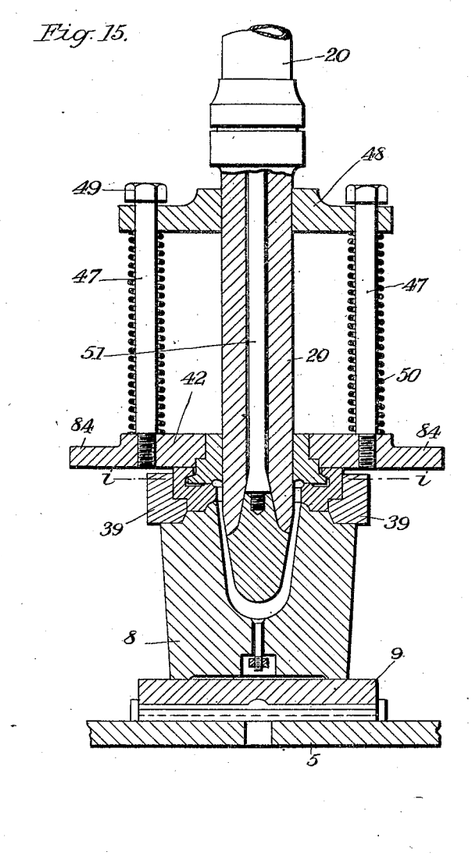
Fig. 15 is a vertical sectional view on line h h, Fig. 14.
Figure 16:
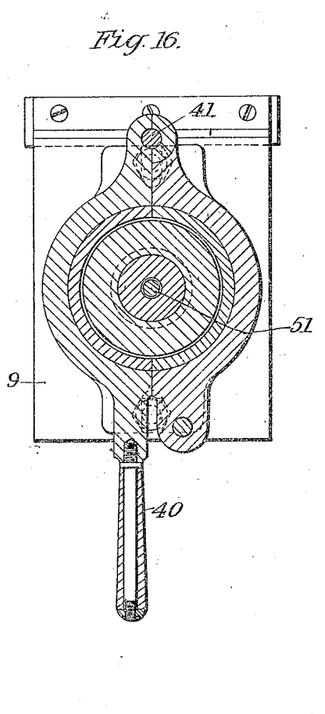
Fig. 16 is a cross-sectional view on line i i, Fig. 15.
Figure 17:
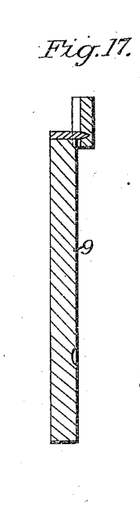
Fig. 17 is a longitudinal sectional view of the loose plate 9, on which the mold 8 rests.
Figure 18:
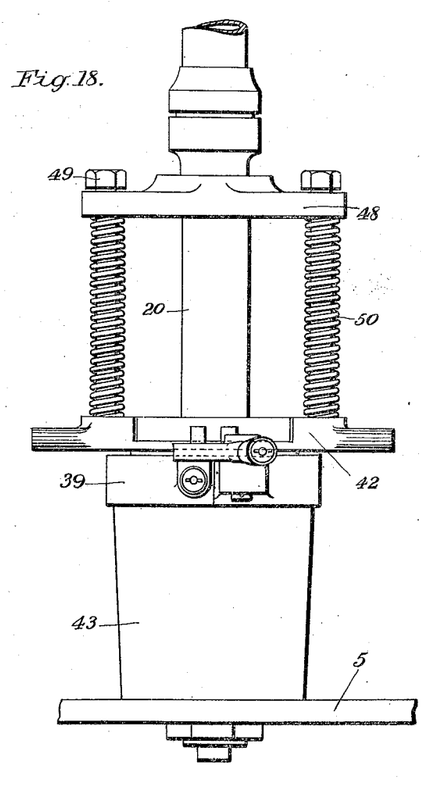
Fig. 18 is a detail view in elevation, on a similar enlarged scale to Fig. 13, of the neck-mold in position on the finishing blowing-mold 43.
Figure 19:
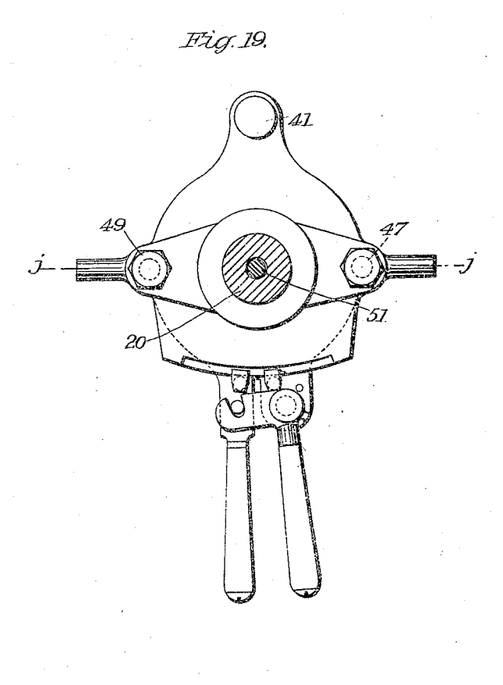
Fig. 19 is a plan thereof.

If desired, the neck-mold 39 may be formed with a removable lining thereto. The under side of said neck-mold (and its lining, if used) is formed as a counterpart of the top edge of the measuring-mold 8, as also of the top edge of each finishing blowing-mold 43, the formation of the top edge of the said molds 43 and 8 and of the under side of the neck-mold being advantageously tapered, as shown in Figs. 3 and 15, so as to guide the neck-mold down to bed snugly and in correct position on the top of the measuring-mold 8 and finishing blowing-mold 43. respectively.

Figure 1:
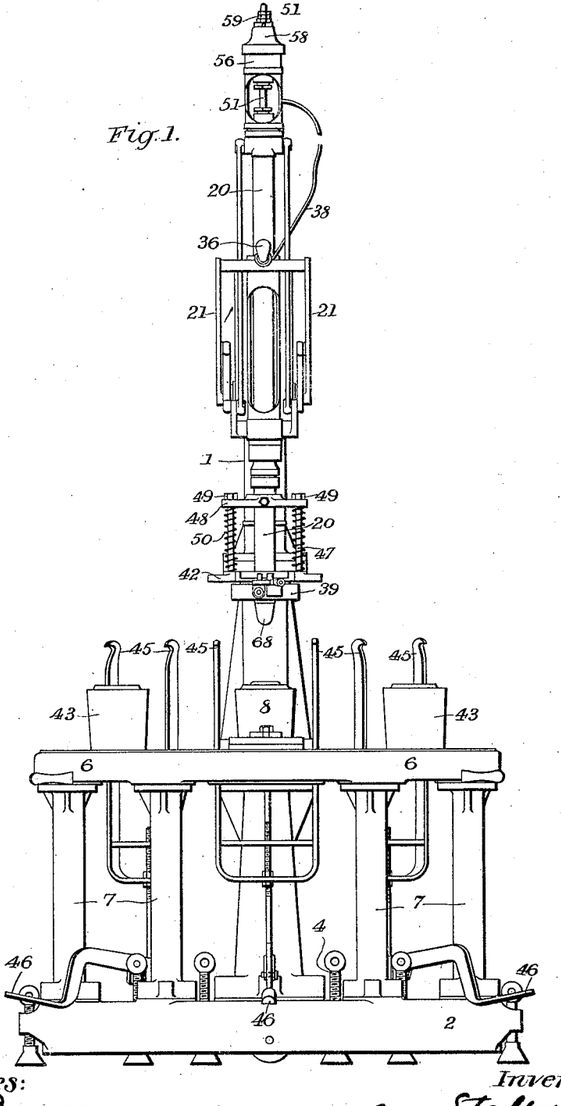
Figure 1 is a front view in elevation of a machine for making glass bottles according to my present invention.
Figure 2:
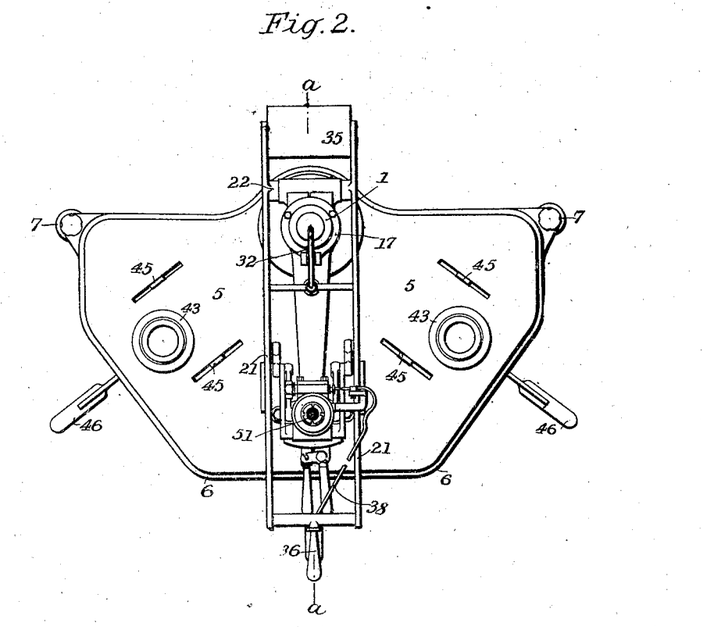
Fig. 2 is a plan thereof.
Figure 2A:
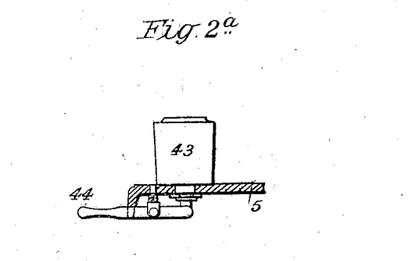
Figure 20:
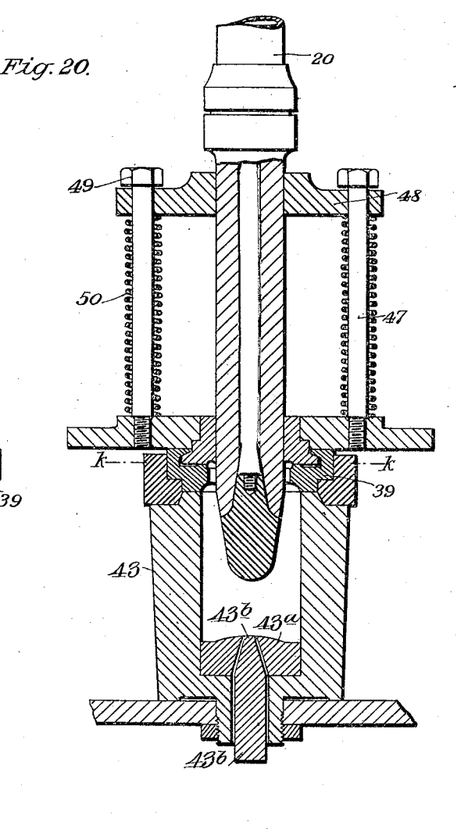
Fig. 20 is a vertical sectional view on line j j, Fig. 19.
Figure 21:
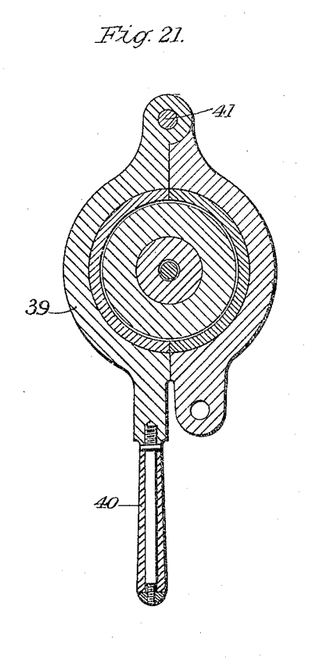
Fig. 21 is a cross-sectional view on line k k, Fig. 20.
Figure 22:
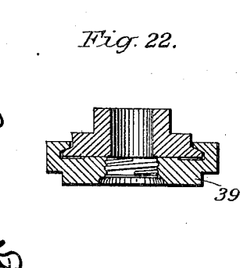
Fig. 22 is a detail vertical sectional view of the neck-mold provided with a screw-thread therein for forming a screw-thread on the exterior of the neck of the bottle, jar, &c.

The blowing-molds 43 are of any suitable character and construction, namely: same may either be vertically divided in two parts hinged together on one side and provided with the usual or any suitable means to close and lock said two parts together, or for making certain types of bottles said finishing-molds 43 may be formed in one part only, as shown in Figs. 1, 2, and 3, in which latter case I provide, as shown in Fig. 2ª and Fig. 20, a lever 44 for lifting the bottle in the mold 43 by means of the pin 43ᵇ, which rests in the bottom 43ª in the mold 43. A pair or other suitable number of clamps or gripping-arms 45 (see Figs. 1 to 3) are provided for the measuring-mold 8 and also, if desired, for each blowing-mold 43, each said pair of clamps 45 being pivoted to and operated by a foot-lever or treadle 46, by which latter said clamps 45 can be drawn down into the position shown in dotted lines in Fig. 3, (to engage the lugs 84 on the plate 42,) whereby the neck-mold 39 when moved down by the plunger 20 on to the top of the measuring-mold 8 (or one of the finishing-molds 43) can be locked or held firmly down in position on said mold as long as desired.

In order that endwise motion of the plunger 20 through the neck-mold 39 may be permitted, the plate 43 is so mounted on the plunger 20 that the latter can be moved endwise through the plate 42, (carrying the neck-mold,) the plate 42 being supported by the vertical rods or pins 47, the upper ends of which pass freely through the plate or frame 48, fixed rigidly to the plunger 20, suitable nuts 49 being provided on the ends of said pins 47 and springs 50 being mounted on the latter between the plate 48 and the plate 42, so as to normally keep said plunger and the plate 48 drawn up against the nuts 49, so that when the neck-mold is by the plunger 20 moved down and rests on either the mold 8 or one of the molds 43 on still further forcing down the plunger 20 thereby the plate 48 will slide down the pins 47 and compress the springs 50 and the plunger 20 will slide through the plate 42 and neck-mold 39 thereon.

Figure 9:
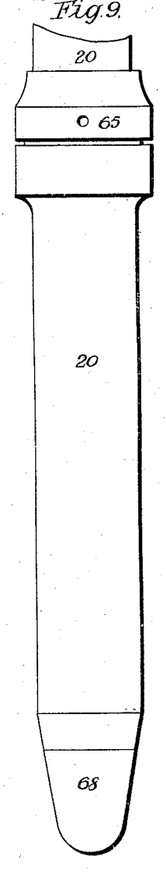
Fig. 9 is a separate view of the plunger on a still larger scale.
Figure 10:
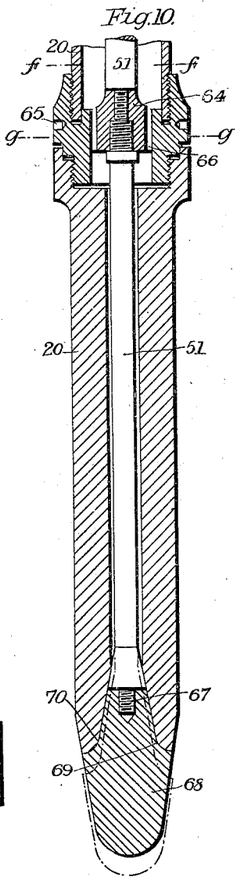
Fig. 10 is a central vertical sectional view thereof.
Figure 11:
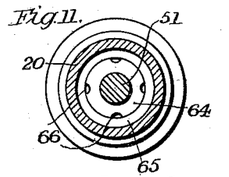
Fig. 11 is a cross-sectional view on line *f f*, Fig. 10.
Figure 12:
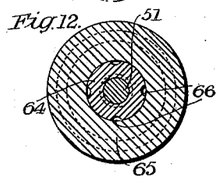
Fig. 12 is a cross-sectional view on line *g g*, Fig. 10.
Figure 13:
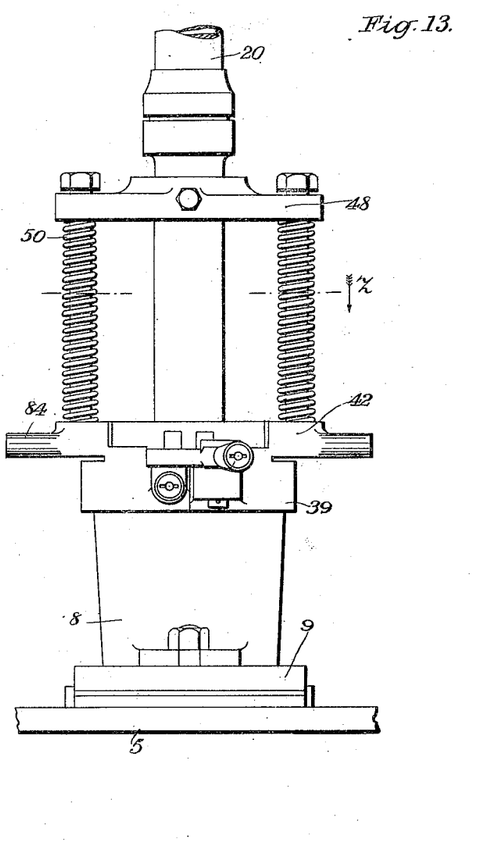
Fig. 13 is a detail view in elevation, on an enlarged scale, of the neck-mold in position on the measuring-mold 8.
Figure 14:
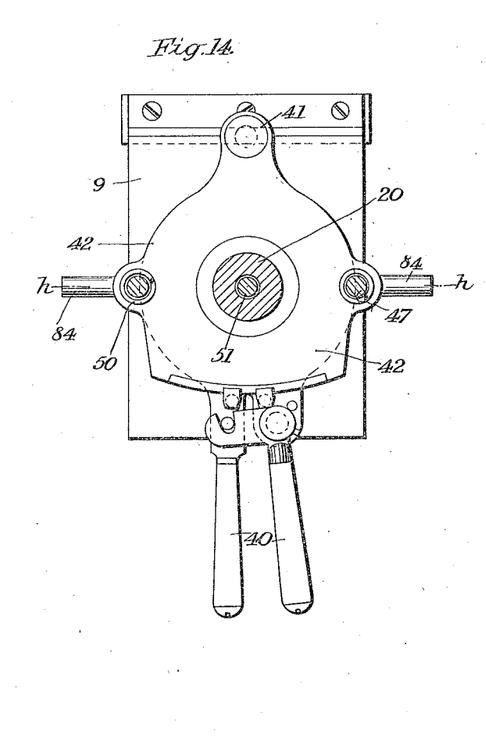
Fig. 14 is a plan view of the plate 42, supporting the neck-mold 39—i. e., looking in the direction of the arrow z.

Referring now to the plunger 20, (and the enlarged views thereof shown in Figs. 4 to 12,) inside this plunger 20 I arrange a vertically-movable rod 51 of less size in cross-section than the interior diameter of the tubular plunger 29, so as to leave a clear annular space between said rod 51 and the interior wall of said hollow plunger 20. Said rod 51 may be of circular or any other suitable shape in cross-section, provided same leaves sufficient space or spaces for the required amount of air to pass down the interior of said plunger 20 to blow the bottle. The upper end of said rod 51 passes through glands or air-tight bearings 52 and 53 and carries a piston 54, provided with a gland or packing 55, fitting the interior of the enlarged cylindrical part of the casing 56, a spring 57 being inserted between the said piston 54 and the inside of the removable cap or cover 58 on said casing 56, the said rod 51 passing freely out through the top of said cap 58 and being provided with a screw-washer or nut 59, adjustable on the screw-threaded upper end of said rod 51, so as to limit the downward movement of said rod 51 as desired. The air-supply coming from any suitable source through the air-supply pipe 60 is admitted by the valve 61 (operated by the aforesaid medium 38 or in any other desired manner) either through the passage-way 62 to the under side of the piston 54, whereby the rod 51 is held pressed upward against the action of the spring 57, or said air-supply is admitted through the passage 63 to the interior of the tubular plunger 20, in which latter event the rod 51 is free to drop or be moved down by the spring 57 until the nut 59 bears against the cap 58. Toward its lower end the vertically-descending rod 51 has an enlargement 64 thereon fitting as a guide in the casing 65, (see Figs. 10 to 12,) vertical air-passages 66 being provided in said enlargement 64, and below this enlargement or guide 64 the rod 51 descends and is attached at 67 to the plug or movable end 68 of the plunger 20. The lower end of the hollow plunger 20 is tapered or somewhat trumpet-mouthed and the upper part of the plug 68 is formed at 69 as a counterpart—that is, so as to correspond with and fit accurately within the trumpet-mouth or tapered opening 70 in the bottom end of the tubular casing of the plunger 20. Thus when the plug 68 is drawn up in the closed position, as shown in Figs. 9 and 10, the outside of said plug or plunger end 68 lies flush with the outside of the plunger 20, while the interior portion 69 of said plug 68 fits accurately within said plunger-casing and holds said plug 68 rigidly in position, while when said plunger end is moved down, as indicated in dotted lines in Fig. 10, to admit air through the plunger to the mold thereby an outwardly-tapering annular opening is formed, thus forming an expansion-chamber in which the air-supply is gradually expanded as it escapes from the lower end of the hollow plunger.

Figure 23:
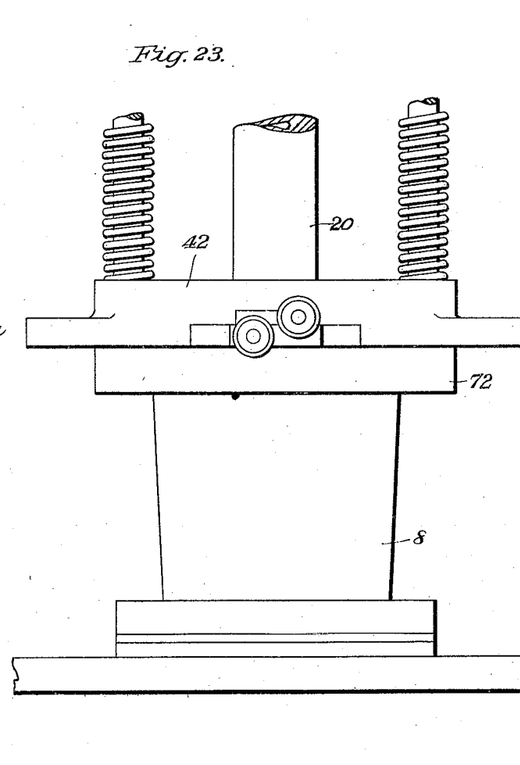
Figs. 23 to 30 show, also on an enlarged scale, various views of modified arrangements of the molds and their adjuncts, as hereinafter explained.
Figure 24:
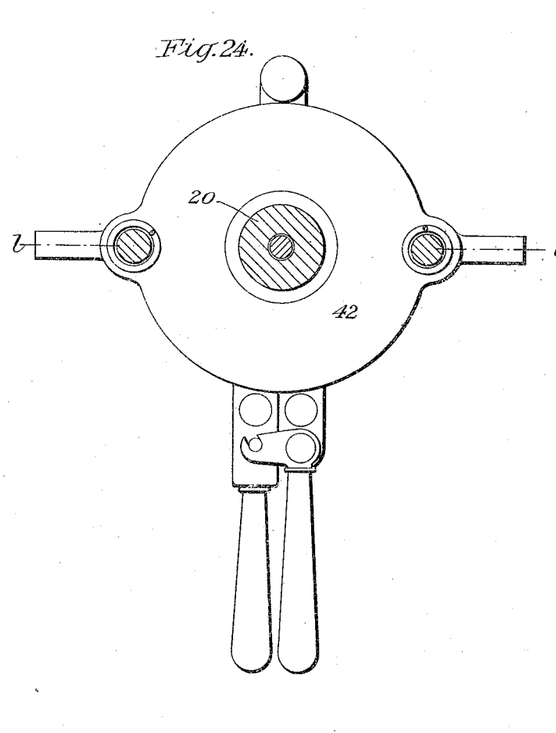
Figure 25:
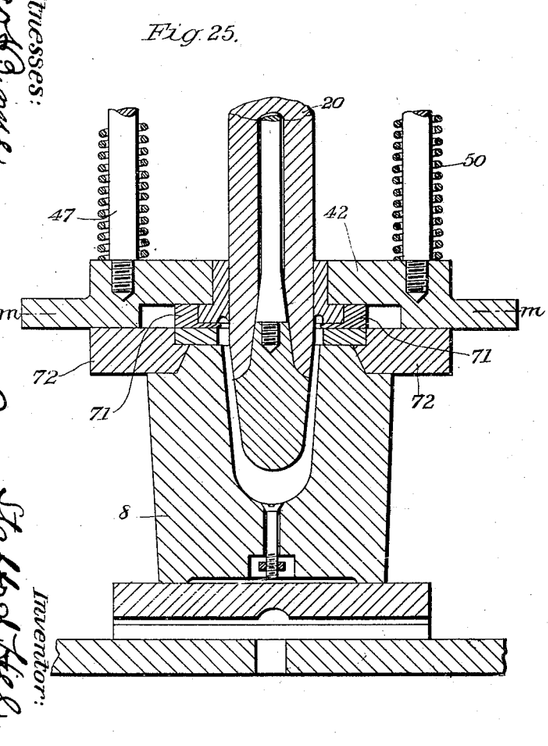
Figure 26:
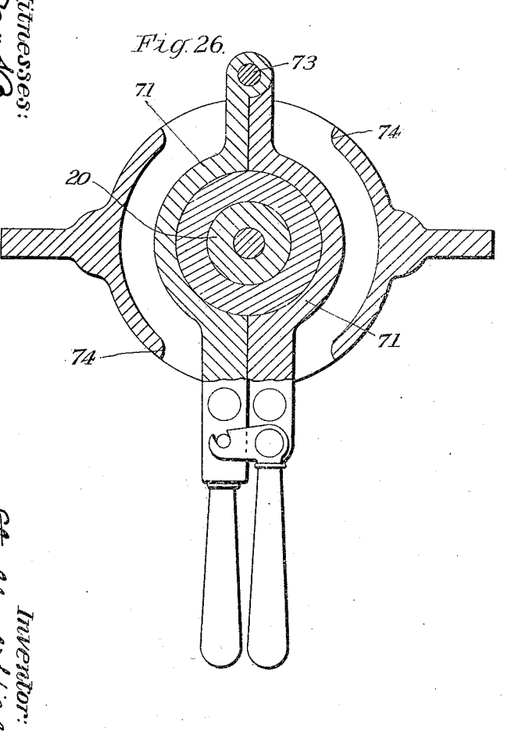

Referring now to the modified arrangements of the molds, as shown in Figs. 23 to 30, Figs. 23 to 26 illustrate an arrangement for producing a smooth exterior to the neck of the bottle—i. e., the neck-mold 39 is mounted in such wise as to be capable of being partially revolved around the exterior of the bottle-mouth, Fig. 23 being a detail view in elevation of this modified arrangement of neck-mold in position on the measuring-mold 8. Fig. 24 is a plan view thereof. Fig. 25 is a vertical sectional view on line *l l*, Fig. 24; and Fig. 26, a horizontal section on line *m m*, Fig. 25.

In the arrangement shown in Figs. 23 to 26 the parts 71 of the neck-mold are movable within and between the fixed top plate 42 and bottom plate 72, these plates 42 and 72 forming housings carrying said movable neck-mold parts 71, which latter are hinged or pivoted together at 73 and not hinged or pivoted to any other part. It will thus be seen that when the neck-mold parts are closed together around the plunger 20, as shown in Figs. 23 to 26, then a limited movement of said closed neck-mold parts 71 can take place around the said plunger 20, said horizontal rotary movement of the said parts 71 being limited in either direction by the shoulders or stops 74 on the upper fixed plate 42. (See Fig. 26.)

Figure 27:
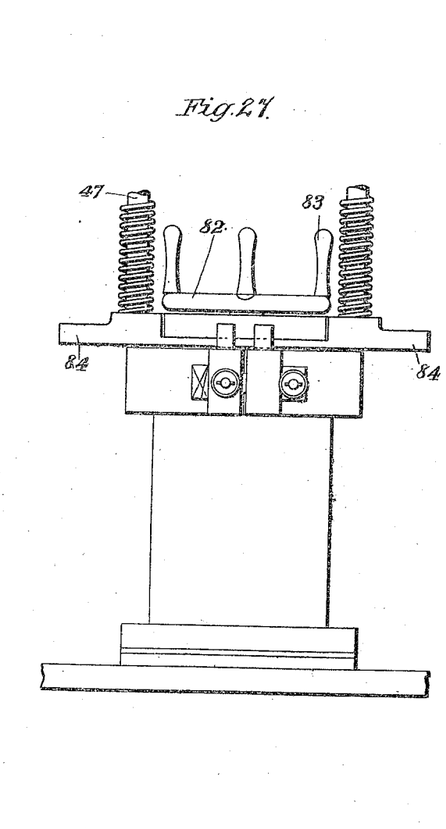
Figure 28:
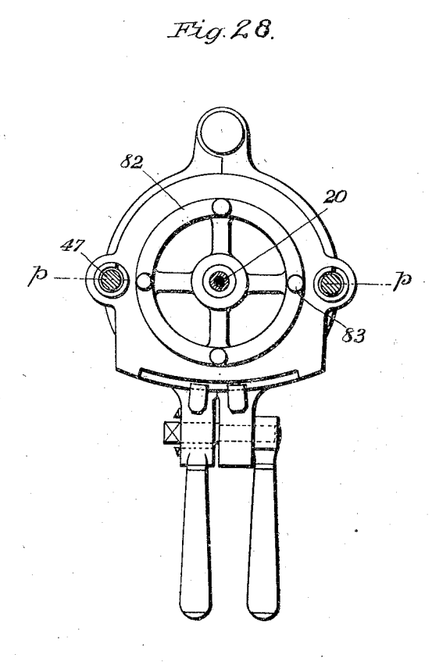
Figure 29:
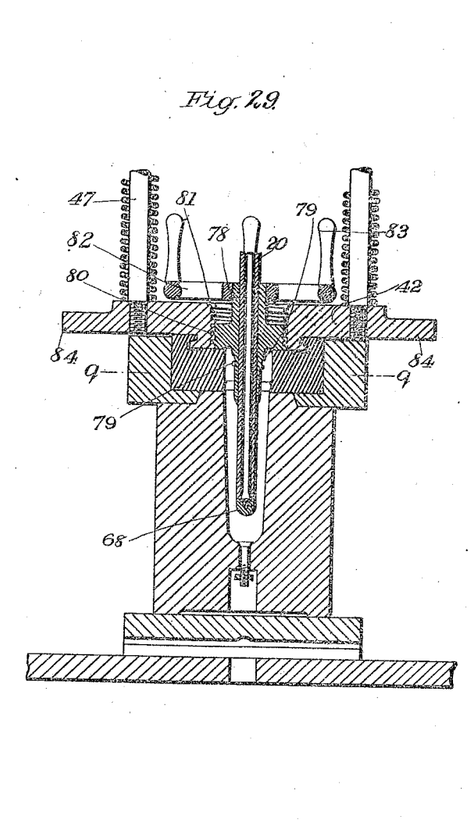
Figure 30:
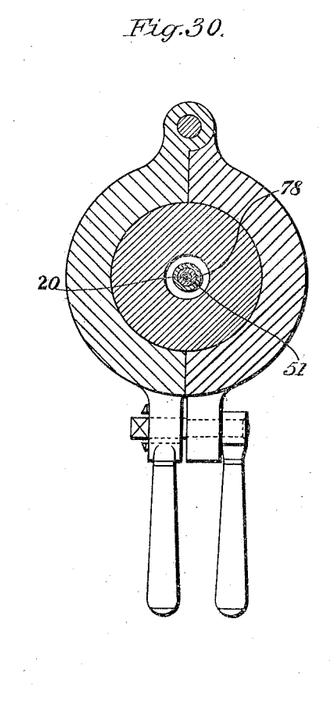

Figs. 27 to 30 show modifications of the foregoing apparatus for the purpose of making internally-screw-threaded bottles, namely: Fig. 27 is a view in elevation of a modified arrangement of the neck-mold in position on the measuring-mold. Fig. 28 is a plan thereof. Fig. 29 is a vertical section on line $p$ $p$, Fig. 28; and Fig. 30 is a cross-sectional view on line $q$ $q$, Fig. 29.

In the arrangement shown in Figs. 27 to 30 the exterior of the lower part of the plunger 20 (above the aforesaid movable end or plug 68) carries thereon a sleeve 78, through which the plunger 20 is capable of sliding, said sleeve 78 being provided with a male screw 79, of any suitable pitch or character, to form an internal screw-thread in the bottle-neck, and just above this male screw 79 said sleeve 78 is shaped to form the top edge of the bottle and is then enlarged and has another male screw 80 (formed on said enlarged part) of corresponding pitch and character to the aforesaid male screw 79. This male screw 80 on said enlargement fits in a corresponding female screw or internally-threaded socket 81, formed in the aforesaid fixed plate 42 just above the neck-mold. The upper part of this sleeve 78 has fixed thereto the hand-wheel 82, provided with handles 83, by which said hand-wheel 82 can be revolved. Before each bottle is molded the sleeve 78 is moved down to its lowermost position, so that the male screw portion 79 lies within the neck-mold, and when the bottle has been molded the male screw portion 79 is withdrawn out of the neck of the bottle (molded around same) by rotating the said sleeve 78 by means of said hand-wheel 82, or I may withdraw said male screw 79 by means of a pinion (not shown) fixed or formed on said sleeve 78, carrying said male screw 79, with a rack adapted to operate such pinion, said rack in turn to be operated by any suitable means—for instance, by means of a piston-rod.

84 represents laterally-extending arms or pins on the plate 42, adapted to be engaged by the clamps 45 to hold said plate 42 and neck-mold down in position on the measuring-mold 8 or on the finishing-molds.

The operation of the machine is as follows: The molten glass is placed in the measuring-mold 8 and the desired quantity weighed by means of the aforesaid weighing apparatus, or, if desired, the weighing apparatus may be dispensed with and the measuring-mold 8 may be fixed down in position on the table 5 and the desired quantum of molten glass ascertained in the usual or any suitable manner. The desired quantity of molten glass having been placed in the measuring or parison mold 8 the plunger 20 is now moved down and the neck-mold 39 thereby placed in position on top of the parison-mold 8 and there held firmly in position by the clamps 45, and the plunger 20 (with its lower end 68) is forced farther through the neck-mold into the molten mass, whereby the latter is pressed up into the neck-mold and the neck of the bottle is thus formed. The neck-mold is now released from the clamps 45 and the plunger system and neck-mold thereon with the inchoate bottle suspended from said neck-mold (around the lower end of the plunger 20) is lifted bodily out of the parison-mold 8 and swung either to the right or left until brought into position over a finishing blowing-mold 43, suitable stops being provided to stop the frame 18 when the plunger 20 is exactly central over the finishing-mold 43. The plunger 20 with the neck-mold and inchoate bottle still suspended in the latter are now all moved down together so that the neck-mold 39 comes to rest on top of the finishing-mold 43 with the inchoate bottle now inside the latter, and thereupon the movable end 68 of the plunger 20 is lowered and the air-supply gently admitted through the plunger 20, as hereinbefore described, and the blowing of the bottle is thereby completed in the finishing blowing-mold thus formed by the finishing-mold 43 and the neck-mold 39 combined. The blowing operation having been finished, the neck-mold 39 is now opened by the handles 40 and then lifted off the finishing-mold 43, together with the plunger 20, thus leaving the now-finished bottle in the mold 43, (or 75,) from which latter said bottle is removed (in any desired manner) and annealed in the usual or any suitable manner.

Having now described my invention, what I claim as new, and desire to secure by Letters Patent of the United States, is—

1. In a machine for manufacturing glass bottles, a plunger, means for reciprocating said plunger, a rotatable neck-mold carried by said plunger, and blowing or finishing molds upon which said neck-mold is adapted to fit.

2. In a machine for molding glass bottles, a longitudinally-movable plunger, means for reciprocating said plunger, a rotatable neck-mold carried by said plunger through which the lower end of said plunger is slidingly movable, and molds upon which said neck-mold is adapted to interchangeably fit.

3. In a machine for manufacturing glass bottles, a hollow plunger, a plug closing the lower end of said plunger, a rod or stem within said plunger and connected to said plug, and fluid-pressure-controlled means for depressing said stem.

4. In a machine for manufacturing glass bottles, a hollow plunger, a plug closing the lower end of said plunger, a rod or stem within said plunger and connected to said plug, and fluid-pressure-operated means for simultaneously depressing said rod, or stem and admitting a supply of air to said plunger.

5. In a machine for manufacturing glass bottles, a hollow plunger, a plug adapted to close the lower end of said plunger, a rod or stem within said plunger and connected to said plug, a piston-head carried upon the upper end of said rod or stem, a cylinder carried upon said plunger, within which said piston-head fits, and means for admitting pressure to said cylinder to operate said rod or stem.

6. In a machine for manufacuring glass bottles, a hollow plunger, a plug adapted to close the lower end of said plunger, a rod or stem within said plunger and connected to said plug, a piston-head carried upon the upper end of said rod or stem, a cylinder carried upon said plunger, within which said piston-head fits, and a valve carried by said plunger for controlling the supply of pressure to said cylinder and the interior of said plunger.

7. In a machine for manufacturing glass bottles, a vertically-disposed plunger, means for elevating and depressing said plunger, means for supplying air through the interior of said plunger, a neck-mold carried by said plunger, a plurality of molds upon which said neck-mold is adapted to fit, and means for locking said neck-mold in position upon said molds.

8. In a machine for manufacturing glass bottles, a vertically-disposed plunger, means for elevating and depressing said plunger, a plug closing the hollow bore of said plunger at its lower end, a cylinder carried upon the upper end of said plunger, a piston mounted therein, and connected to said plug, a valve carried by said plunger for admitting fluid-pressure to said cylinder, and to the hollow interior of said plunger, a neck-mold carried by said plunger and blowing or finishing molds upon which said neck-mold is adapted to interchangeably fit.

9. The combination in machinery for the manufacture of glass bottles or jars, of a tubular plunger vertically supported and adapted to be reciprocated in the direction of its length, a movable end or plug to open and close the lower end of said tubular plunger, means to operate said movable end or plug, a neck-mold carried on said plunger near the lower end thereof and supported thereon in such wise as to permit endwise movement of said plunger through said neck-mold, a parison-mold mounted beneath said plunger upon which said neck-mold is adapted to fit, and weighing mechanism connected to said parison-mold whereby a predetermined quantity of glass may be placed in said mold.

10. The combination in machinery for the manufacture of glass bottles or jars, of a tubular plunger vertically supported and adapted to be reciprocated in the direction of its length having a trumpet-mouthed or outwardly-tapering opening at the lower end thereof, a movable end or plug the upper part of which latter is adapted to fit in said enlarged opening in the lower end of said plunger said plug forming a rounded bottom end to said plunger with the side thereof flush with the side of said plunger and adapted when lowered to leave an annular space between the upper part of said plug and the said lower end of said plunger, and fluid-pressure-controlled means to raise and lower said movable end or plug, substantially as and for the purposes hereinbefore described.

11. The combination in machinery for the manufacture of glass bottles or jars, of a tubular plunger vertically supported and adapted to be reciprocated in the direction of its length and having a trumpet-mouthed or outwardly-tapering opening at the lower end thereof, a movable end or plug the upper part of which latter is adapted to fit in said enlarged opening in the lower end of said tubular plunger, a connecting-rod located and guided within said tubular plunger the lower end of which rod is attached to said movable end or plug and the upper end of said rod provided with a piston located in a cylinder and operated in an upward direction by air-pressure in said cylinder, means to admit air to the under side of said piston and simultaneously cut off the air-supply from passing down said tubular plunger to thereby draw up the plug in closed position against the lower end of the plunger, and also to admit the air-supply through the hollow plunger and simultaneously release the air-pressure under the piston and thereby release the plug and allow same to drop and thus permit the air-supply to flow through the tubular plunger and out of the lower end thereof to blow the bottle or jar substantially as and for the purposes hereinbefore described.

In witness whereof I have hereunto set my hand in presence of two witnesses.

STAFFORD HILL.

Witnesses:
 FRANCIS H. FRIGOUT,
 A. NUTTING.